United States Patent
Baltsan et al.

(10) Patent No.: US 9,916,498 B2
(45) Date of Patent: Mar. 13, 2018

(54) DISTRIBUTED DOCUMENT PROCESSING

(71) Applicant: Orbograph LTD, Billerica, MA (US)

(72) Inventors: Avikam Baltsan, Tel-Aviv (IL); Ori Sarid, Herzliya (IL); Aryeh Elimelech, Ramat Gan (IL); Aharon Boker, Moshav Avigdor (IL); Zvi Segal, Raanana (IL); Gideon Miller, Jerusalem (IL)

(73) Assignee: Orbograph Ltd., Billerica, MA (US)

( * ) Notice: Subject to any disclaimer, the term of this patent is extended or adjusted under 35 U.S.C. 154(b) by 0 days.

(21) Appl. No.: 15/420,017

(22) Filed: Jan. 30, 2017

(65) Prior Publication Data

US 2017/0206407 A1  Jul. 20, 2017

Related U.S. Application Data

(63) Continuation of application No. 14/543,596, filed on Nov. 17, 2014, now Pat. No. 9,558,417, which is a continuation of application No. 13/948,167, filed on Jul. 22, 2013, now Pat. No. 8,891,873, which is a continuation of application No. 13/316,669, filed on Dec. 12, 2011, now Pat. No. 8,494,270, which is a continuation of application No. 13/024,999, filed on Feb. 10, 2011, now Pat. No. 8,077,972, which is a continuation of application No. 11/203,208, filed on Aug. 15, 2005, now Pat. No. 7,912,287, which is a continuation of application No. 09/995,763, filed on Nov. 29, 2001, now Pat. No. 6,931,589.

(51) Int. Cl.
*G06K 9/00* (2006.01)
*G06K 9/34* (2006.01)
*G06K 9/03* (2006.01)
*G06K 9/18* (2006.01)
*G06F 17/24* (2006.01)
*G06Q 10/08* (2012.01)

(52) U.S. Cl.
CPC ....... *G06K 9/00442* (2013.01); *G06F 17/243* (2013.01); *G06K 9/00993* (2013.01); *G06K 9/033* (2013.01); *G06K 9/18* (2013.01); *G06K 9/34* (2013.01); *G06Q 10/087* (2013.01); *G06K 2209/01* (2013.01)

(58) Field of Classification Search
CPC . G06K 9/00; G06K 9/18; G06Q 10/10; G06F 17/24
USPC ........................................................ 382/182
See application file for complete search history.

(56) References Cited

U.S. PATENT DOCUMENTS

| | | |
|---|---|---|
| 4,264,808 A | 4/1981 | Owens et al. |
| 4,888,812 A | 12/1989 | Dinan et al. |
| 5,054,096 A | 10/1991 | Beizer |
| 5,247,661 A | 9/1993 | Hager |
| 5,444,794 A | 8/1995 | Uhland |
| 5,488,671 A | 1/1996 | Kern |
| 5,668,897 A | 9/1997 | Stolfo |

(Continued)

*Primary Examiner* — Gregory F Cunningham
(74) *Attorney, Agent, or Firm* — Loginov & Associates; William A. Loginov

(57) ABSTRACT

A system for document processing including decomposing an image of a document into at least one data entry region sub-image, providing the data entry region sub-image to a data entry clerk available for processing the data entry region sub-image, receiving from the data entry clerk a data entry value associated with the data entry region sub-image, and validating the data entry value.

16 Claims, 12 Drawing Sheets

(56) References Cited

U.S. PATENT DOCUMENTS

| | | | |
|---|---|---|---|
| 5,689,625 A | 11/1997 | Austin et al. | |
| 5,748,780 A | 5/1998 | Stolfo | |
| 5,761,396 A | 6/1998 | Austin et al. | |
| 5,781,711 A | 7/1998 | Austin et al. | |
| 5,805,747 A * | 9/1998 | Bradford | G06K 9/6292 |
| | | | 382/185 |
| 5,889,896 A | 3/1999 | Meshinsky et al. | |
| 5,893,128 A | 4/1999 | Nauckhoff | |
| 5,920,846 A | 7/1999 | Storch et al. | |
| 6,295,387 B1 | 9/2001 | Burch | |
| 6,584,466 B1 | 6/2003 | Serbinis et al. | |
| 6,742,161 B1 | 5/2004 | James et al. | |
| 6,766,069 B1 | 7/2004 | Dance et al. | |
| 7,181,430 B1 | 2/2007 | Buchanan et al. | |
| 7,289,685 B1 | 10/2007 | Wolff et al. | |
| 7,912,287 B2 | 3/2011 | Baltsan et al. | |
| 8,077,972 B2 | 12/2011 | Baltsan et al. | |
| 8,494,270 B2 | 7/2013 | Baltsan et al. | |
| 9,558,417 B2 * | 1/2017 | Baltsan | G06F 17/243 |
| 2003/0028522 A1 | 2/2003 | Collins-Thompson et al. | |
| 2003/0043397 A1 | 3/2003 | Kaltenecker et al. | |
| 2004/0097188 A1 | 5/2004 | Tanimoto | |
| 2004/0181749 A1 * | 9/2004 | Chellapilla | G06F 17/243 |
| | | | 715/222 |
| 2005/0154649 A1 | 7/2005 | Jalili | |
| 2013/0251236 A1 | 9/2013 | Murata | |
| 2013/0287284 A1 | 10/2013 | Nepomniachtchi et al. | |
| 2013/0329984 A1 | 12/2013 | Kinoshita | |
| 2016/0247032 A9 * | 8/2016 | Baltsan | G06F 17/243 |

* cited by examiner

DISTRIBUTED DOCUMENT PROCESSING

RELATED APPLICATIONS

This application is a continuation of co-pending U.S. patent application Ser. No. 13/948,167, filed Jul. 22, 2013, entitled DISTRIBUTED DOCUMENT PROCESSING, the entire disclosure of which is herein incorporated by reference, which is a continuation of U.S. patent application Ser. No. 13/316,669, filed Dec. 12, 2011, entitled DISTRIBUTED DOCUMENT PROCESSING, now U.S. Pat. No. 8,494,270, issued Jul. 23, 2013, the entire disclosure of which is herein incorporated by reference, which is a continuation of U.S. patent application Ser. No. 13/024,999, filed Feb. 10, 2011, entitled DISTRIBUTED DOCUMENT PROCESSING, now U.S. Pat. No. 8,077,972, issued Dec. 13, 2011, the entire disclosure of which is herein incorporated by reference, which is a continuation of U.S. patent application Ser. No. 11/203,208, filed Aug. 15, 2005, entitled DISTRIBUTED DOCUMENT PROCESSING, now U.S. Pat. No. 7,912,287, issued Mar. 22, 2011, the entire disclosure of which is herein incorporated by reference, which is a continuation of U.S. patent application Ser. No. 09/995,763, filed Nov. 29, 2001, now U.S. Pat. No. 6,931,589, issued Aug. 16, 2005, the entire disclosure of which is herein incorporated by reference.

FIELD OF THE INVENTION

The present invention relates to document processing systems in general, and more particularly to computer-based document processing systems that employ document imaging and optical character recognition.

BACKGROUND OF THE INVENTION

Document processing employing Optical Character Recognition (OCR) is well known. The OrboCAR line of products, commercially available from Orbograph Ltd., of Yavne, Israel, provides optical character recognition of handwritten and printed document elements, primarily for the banking industry. While the OrboCAR line of products automatically reads the majority of those document elements successfully, the remaining document elements must be manually keyed by clerks. Such manual keying involves high labor costs and management attention.

SUMMARY OF THE INVENTION

The present invention seeks to provide a distributed document processing architecture that overcomes disadvantages and limitations of the prior art.

In one aspect of the present invention a method for document processing is provided, the method including a) receiving availability profiles from a plurality of personnel operating a plurality of remote computers, b) receiving a work order from a remote customer's computer, the work order having a time frame within which the work order may be serviced, where any of the availability profiles indicates that any of the personnel are available to service the work order within the time frame c) receiving within the context of the work order an image of a document from the remote customer's computer, d) decomposing the image into a plurality of data entry region sub-images, e) providing any of the plurality of data entry region sub-images to the available personnel at the remote computers, and f) receiving from each of the plurality of remote computers a data entry value associated with at least one of the data entry region sub-images.

In another aspect of the present invention any of the steps are performed at a central computer that is in communication with any of the remote computers.

In another aspect of the present invention the providing step e) includes transmitting each of the data entry region sub-images together with a unique identifier.

In another aspect of the present invention the method further includes collating—the data entry values into a character-based electronic document corresponding to the image.

In another aspect of the present invention the method further includes providing the electronic document to the remote customer.

In another aspect of the present invention the method further includes performing optical character recognition on any of the data entry region sub-images, and the providing step e) includes providing if a score related to a result of the performing optical character recognition is below a predefined threshold.

In another aspect of the present invention the method further includes performing optical character recognition on any of the data entry region sub-images, thereby resulting in an optical character recognition value, comparing the data entry value associated with the data entry region sub-image to the optical character recognition value, and where the data entry value and the optical character recognition value differ, providing the data entry region sub-image to another one of the available personnel to which the data entry region sub-image was not previously provided.

In another aspect of the present invention the providing step e) includes providing at least one of the plurality of data entry region sub-images to at least two of the available personnel, and where a predetermined number of the data entry values associated with the data entry region sub-images are the same, the collating step includes collating one of the predetermined number of the data entry values.

In another aspect of the present invention the method further includes providing in the providing step e) at least one of the plurality of data entry region sub-images to a plurality of the available personnel, performing optical character recognition on the data entry region sub-image, thereby resulting in an optical character recognition value, comparing a plurality of the data entry values associated with the data entry region subimage and the optical character recognition value, and collating in the collating step one of the values from among a predetermined number of the values that are the same.

In another aspect of the present invention the method further includes receiving from any of the plurality of remote computers an indicator associated with at least one of the data entry region sub-images rejecting the associated data entry region sub-image, and providing to the rejecting remote computer an expanded data entry region sub-image that includes the rejected data entry region sub-image.

In another aspect of the present invention the method further includes rating the performance of any of the data entry clerks, selecting any of the data entry clerks to service the work order whose performance rating equals or exceeds a performance rating specified for the work order.

In another aspect of the present invention the method further includes selecting any of the data entry clerks to service the work order who have been pre-approved by the customer.

In another aspect of the present invention a system for document processing is provided, the system including a plurality of availability profiles for a plurality of personnel operating a plurality of remote computers, a work order received from a remote customer's computer, the work order having a time frame within which the work order may be serviced, means for determining whether any of the availability profiles indicates that any of the personnel are available to service the work order within the time frame, means for receiving within the context of the work order an image of a document from the remote customer's computer, means for decomposing the image into a plurality of data entry region sub-images, means for providing any of the plurality of data entry region sub-images to the available personnel at the remote computers, and means for receiving from each of the plurality of remote computers a data entry value associated with at least one of the data entry region sub-images.

In another aspect of the present invention the system further includes a central computer that is in communication with any of the remote computers and that is configured with any of the elements mentioned hereinabove.

In another aspect of the present invention the means for providing is operative to transmit each of the data entry region sub-images together with a unique identifier.

In another aspect of the present invention the system further includes means for collating the data entry values into a character-based electronic document corresponding to the image.

In another aspect of the present invention the system further includes means for providing the electronic document to the remote customer.

In another aspect of the present invention the system further includes means for performing optical character recognition on any of the data entry region sub-images, and the means for providing is operative to provide if a score related to a result of the performing optical character recognition is below a predefined threshold.

In another aspect of the present invention the system further includes means for performing optical character recognition on any of the data entry region sub-images and being operative to provide an optical character recognition value, means for comparing the data entry value associated with the data entry region kb-image to the optical character recognition value, and means for providing the data entry region sub-image to another one of the available personnel to which the data entry region sub-image was not previously provided, operative where the data entry value and the optical character recognition value differ.

In another aspect of the present invention the means for providing is operative to provide at least one of the plurality of data entry region sub-images to at least two of the available personnel, and, where a predetermined number of the data entry values associated with the data entry region sub-images are the same, where the means for collating is operative to collate one of the predetermined number of the data entry values.

In another aspect of the present invention the means for providing is operative to provide at least one of the plurality of data entry region sub-images to a plurality of the available personnel, and the system further includes means for performing optical character recognition on the data entry region sub-image, operative to provide an optical character recognition value, and means for comparing a plurality of the data entry values associated with the data entry region sub-image and the optical character recognition value, and where the means for collating is operative to collate one of the values from among a predetermined number of the values that are the same.

In another aspect of the present invention the system further includes means for receiving from any of the plurality of remote computers an indicator associated with at least one of the data entry region sub-images rejecting the associated data entry region subimage, and means for providing to the rejecting remote computer an expanded data entry region sub-image that includes the rejected data entry region sub-image.

In another aspect of the present invention the system further includes a performance rating of any of the data entry clerks, and means for selecting any of the data entry clerks to service the work order whose performance rating equals or exceeds a performance rating specified for the work order.

In another aspect of the present invention the system further includes means for selecting any of the data entry clerks to service the work order who have been pre-approved by the customer.

The disclosures of all patents, patent applications, and other publications mentioned in this specification and of the patents, patent applications, and other publications cited therein are hereby incorporated by reference in their entirety.

BRIEF DESCRIPTION OF THE DRAWINGS

The present invention will be understood and appreciated more fully from the following detailed description taken in conjunction with the appended drawings in which.

DETAILED DESCRIPTION

Figure 1:
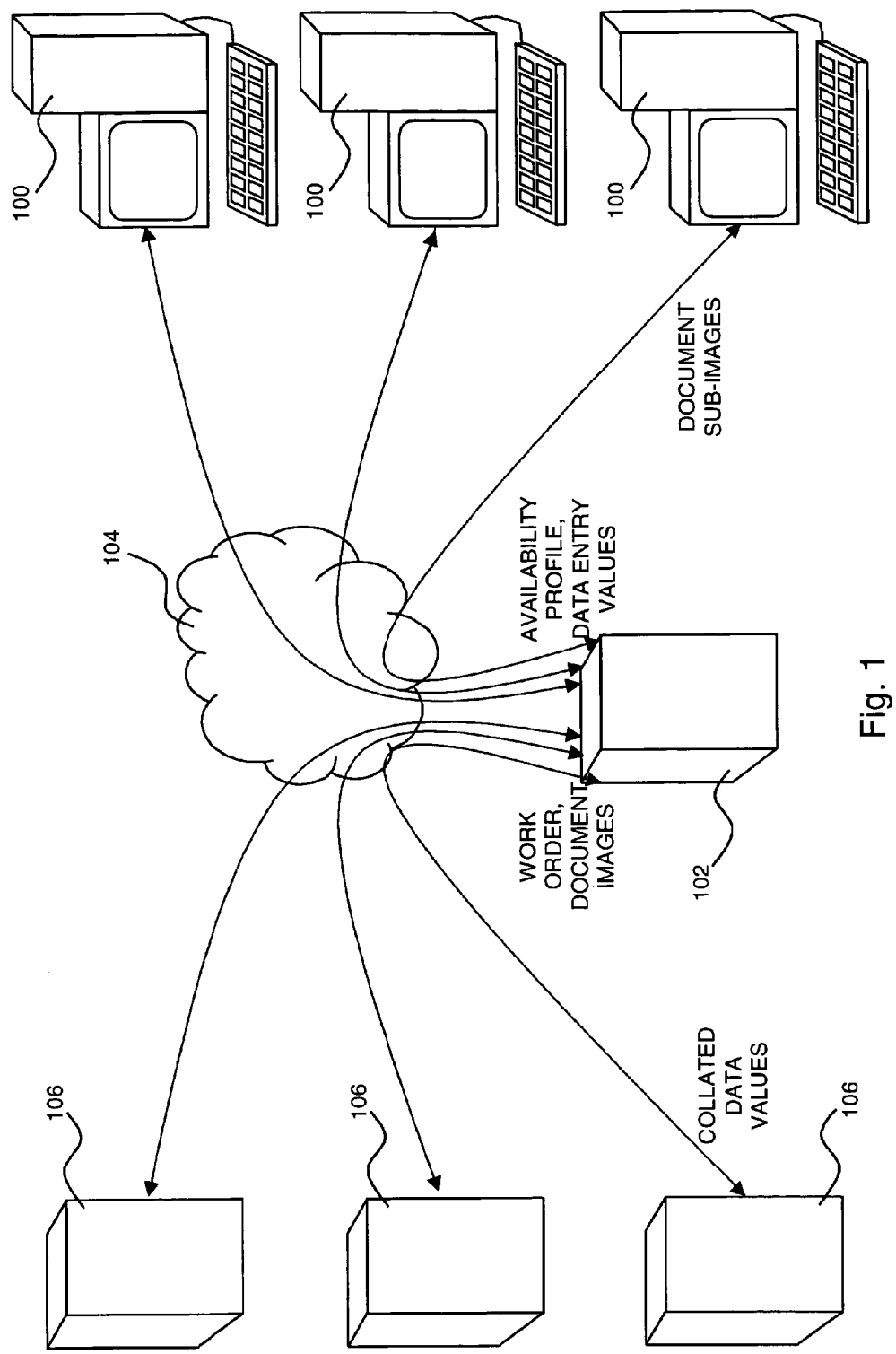
FIG. 1 is a simplified conceptual illustration of a distributed document processing architecture, constructed and operative in accordance with a preferred embodiment of the present invention.

Reference is now made to FIG. 1, which is a simplified conceptual illustration of a distributed document processing architecture, constructed and operative in accordance with a preferred embodiment of the present invention. In the architecture of FIG. 1 one or more computers 100, such as for use by data entry clerks, are configured for communication with one or more computers 102 via a communications medium 104, such as the Internet.

Similarly, one or more customer computers 106 are configured for communication with computer 102 via communications medium 104 or any other suitable communications medium. Any of computers 106 and/or any of computers 102 may be configured to perform optical character recognition on images of documents that include portions that require optical character recognition, such as, but not limited to, handwritten portions, and may be otherwise configured to perform portions of any of the methods described hereinbelow.

Figure 2A:
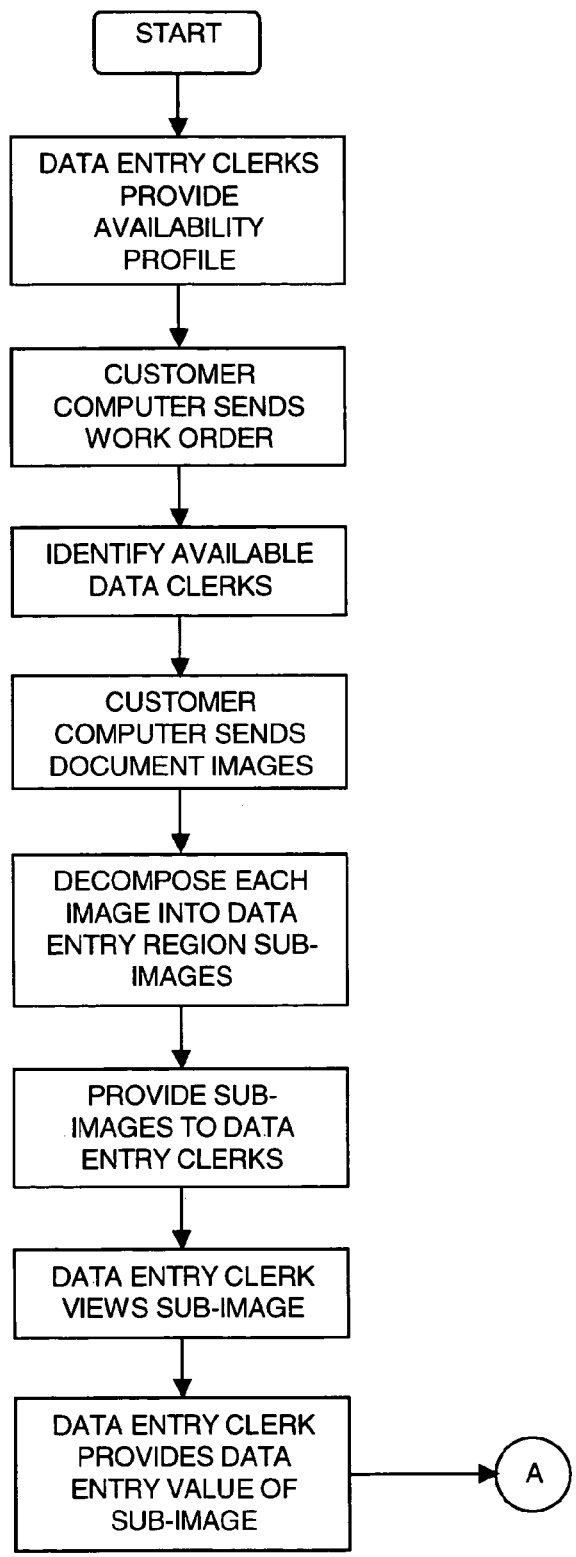
FIGS. 2A-2B, taken together, is a simplified flowchart illustration of an exemplary mode of operation of the architecture of FIG. 1, operative in accordance with a preferred embodiment of the present invention.
Figure 2B:
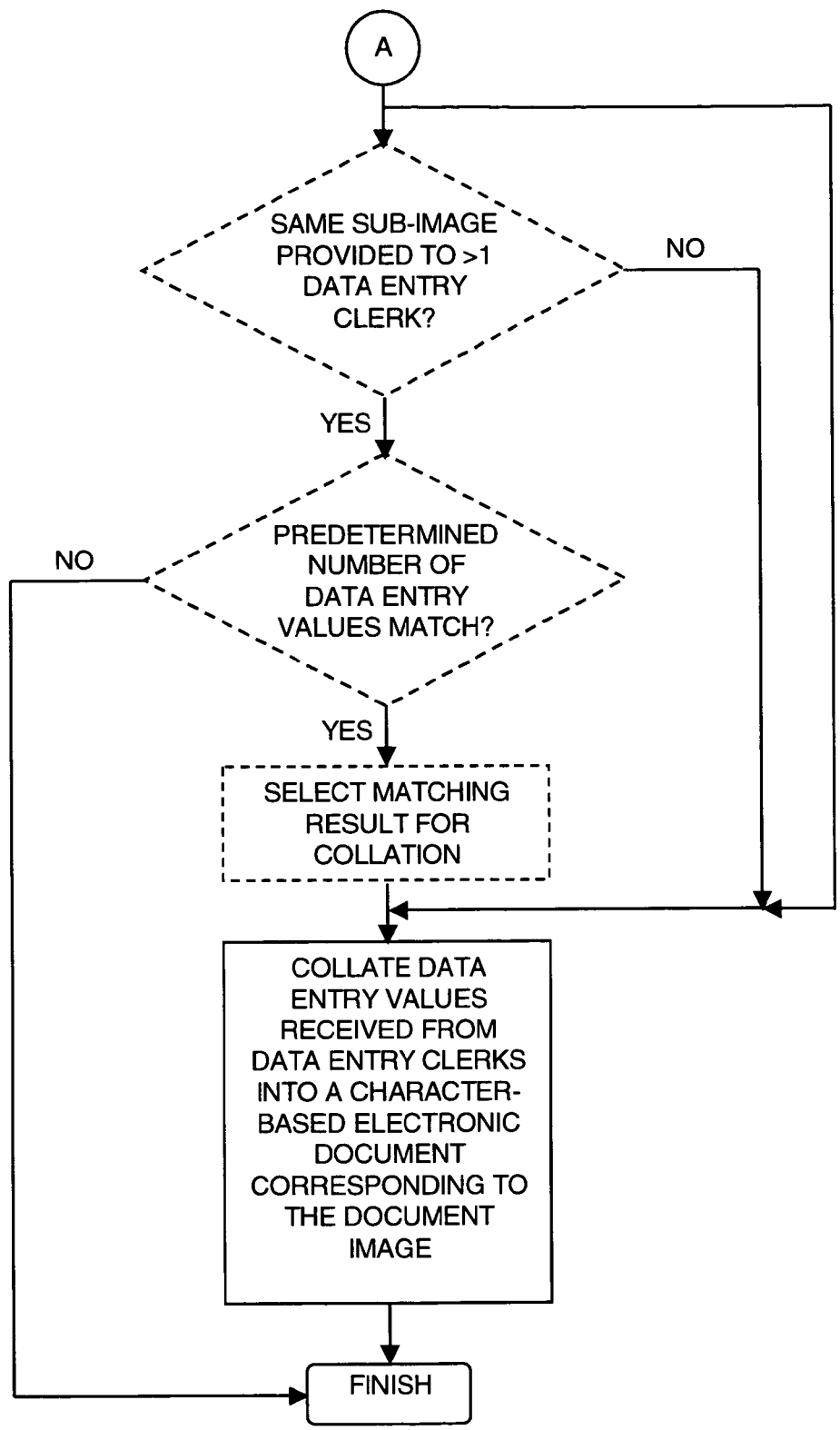

Reference is now made to FIGS. 2A and 2B, which, taken together, is a simplified flowchart illustration of an exemplary mode of operation of the architecture of FIG. 1, operative in accordance with a preferred embodiment of the present invention. In the method of FIGS. 2A and 2B one or more data entry clerks at one or more of computers 100 provide an availability profile to computer 102 via communications medium 104 or any other suitable communications medium. The available profile of a data entry clerk preferably indicates the availability of the clerk to perform manual data entry tasks at various times, such as by specifying specific dates, days of the week, hours of the day, etc.

Independently, any of customer computers 106 send one or more work orders to computer 102 via communications medium 104 or any other suitable communications medium. Each work order preferably indicates a time frame within which a job may be serviced, as well as some measure of the magnitude of the job, such as the number of documents to be processed computer 102 then identifies those data clerks whose availability profile indicates that the data entry clerk would be available to work on the job within the indicated time frame.

Together with the work order, or separately therefrom, computer 106 sends to computer 102 for processing one or more document images that comprise the job specified by the work order. Computer 102 then decomposes each image into one or more data entry region sub-images using conventional techniques, where each sub-image includes an element that requires interpretation or recognition, now referred to as a recognition element, such as, but not limited to, a handwritten element. Computer 102 then provides each subimage to one or more available data entry clerks at one or more computers 100, typically together with a unique identifier identifying the sub-image. The data entry clerk then views the sub-image, keys in a data entry value from the characters appearing in the recognition element of the sub-image, and transmits the data entry value to computer 102, typically together with the unique identifier where provided. For each document image, computer 102 collates data entry values received from data entry clerks into a character-based electronic document corresponding to the document image. Optionally (optional steps are shown in dashed lines), where a single sub-image is provided to more than one data entry clerk who each provide an associated data entry value, if a predetermined number of these values are the same, the matching result may be selected for collation as indicated above.

Figure 3A:
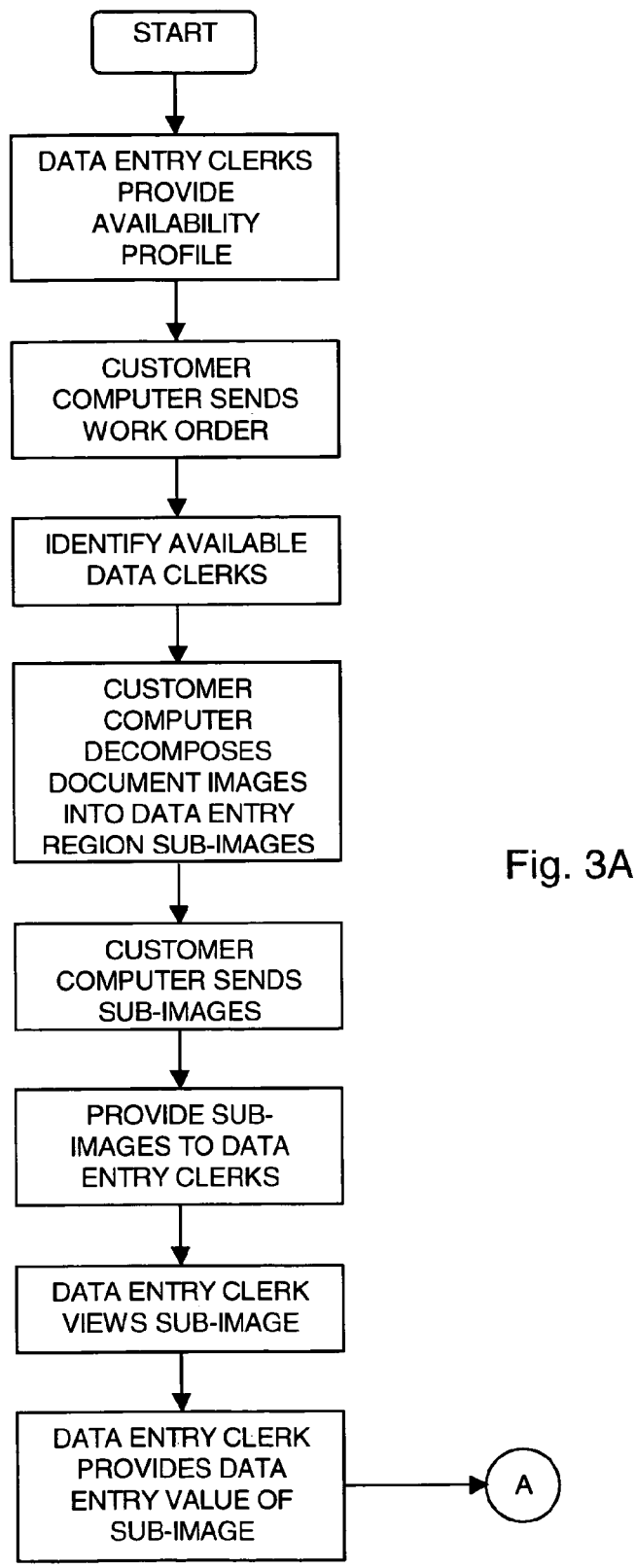
FIGS. 3A-3B, taken together, is a simplified flowchart illustration of an exemplary mode of operation of the architecture of FIG. 1, operative in accordance with a preferred embodiment of the present invention.
Figure 3B:
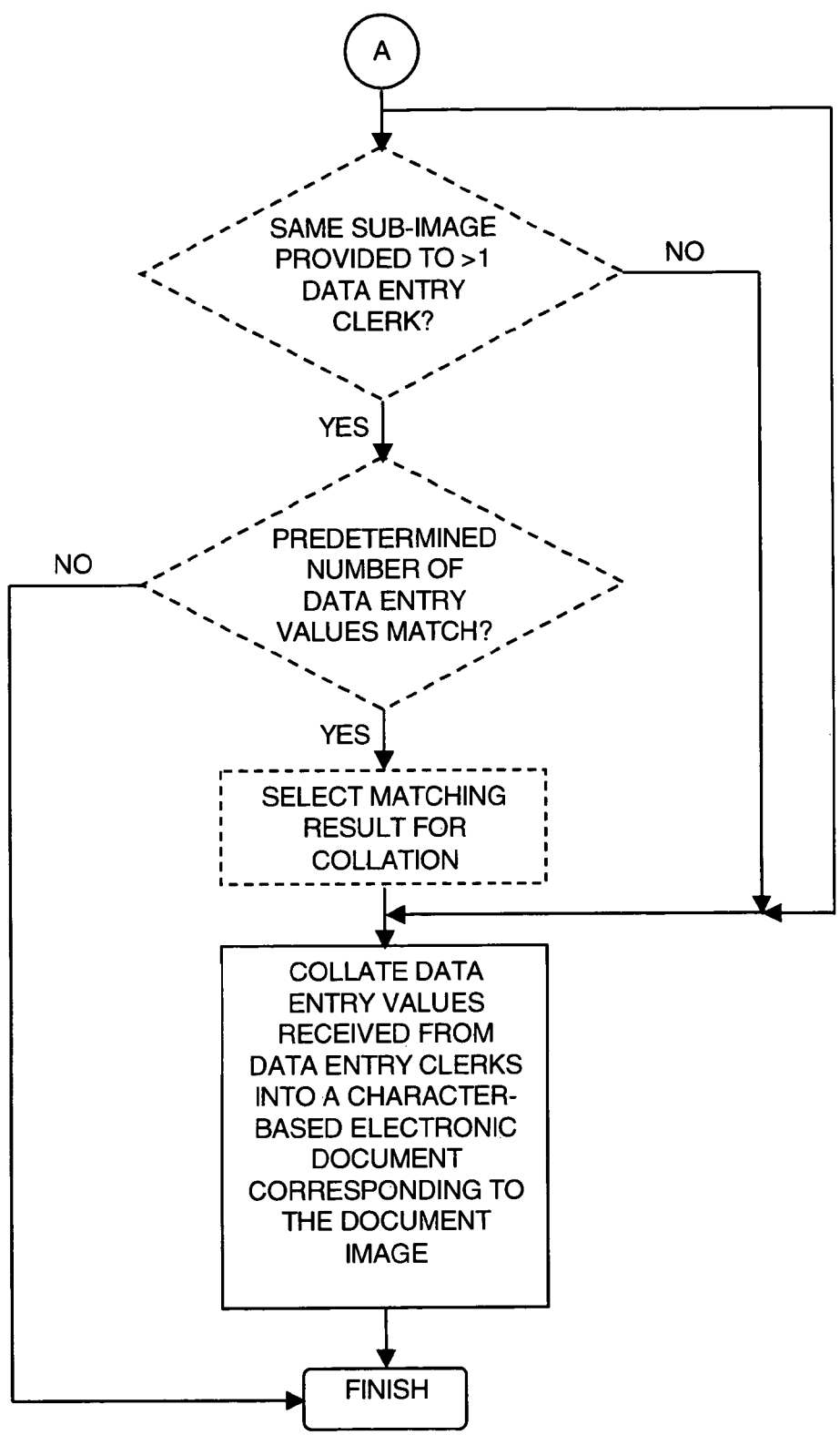

Reference is now made to FIGS. 3A and 3B, which, taken together, is a simplified flowchart illustration of an exemplary mode of operation of the architecture of FIG. 1, operative in accordance with a preferred embodiment of the present invention. The method of FIGS. 3A and 3B is similar to the method of FIGS. 2A and 2B except as is now noted. Unlike the method of FIGS. 2A and 2B, computer 106 decomposes each document image into one or more data entry region sub-images using conventional techniques, where each sub-image includes a recognition element. Computer 106 then provides each subimage to computer 102, typically together with a unique identifier identifying the sub-image. Computer 102 then provides each sub-image to one or more available data entry clerks at one or more computers 100, typically together with the unique identifier identifying the sub-image. The data entry clerk then views the sub-image, keys in a data entry value from the characters appearing in the recognition element of the sub-image, and transmits the data entry value to computer 102, typically together with the unique identifier where provided. For each document image, computer 102 collates data entry values received from data entry clerks into a character-based electronic document corresponding to the document image. Alternatively, computer 102 may forward the data entry values to computer 106 which then collates the data entry values into a character-based electronic document corresponding to the document image. In either case, where a single sub-image is provided to more than one data entry clerk who each provide an associated data entry value, if a predetermined number of these values are the same, the matching result may be selected for collation as indicated above.

Figure 4A:
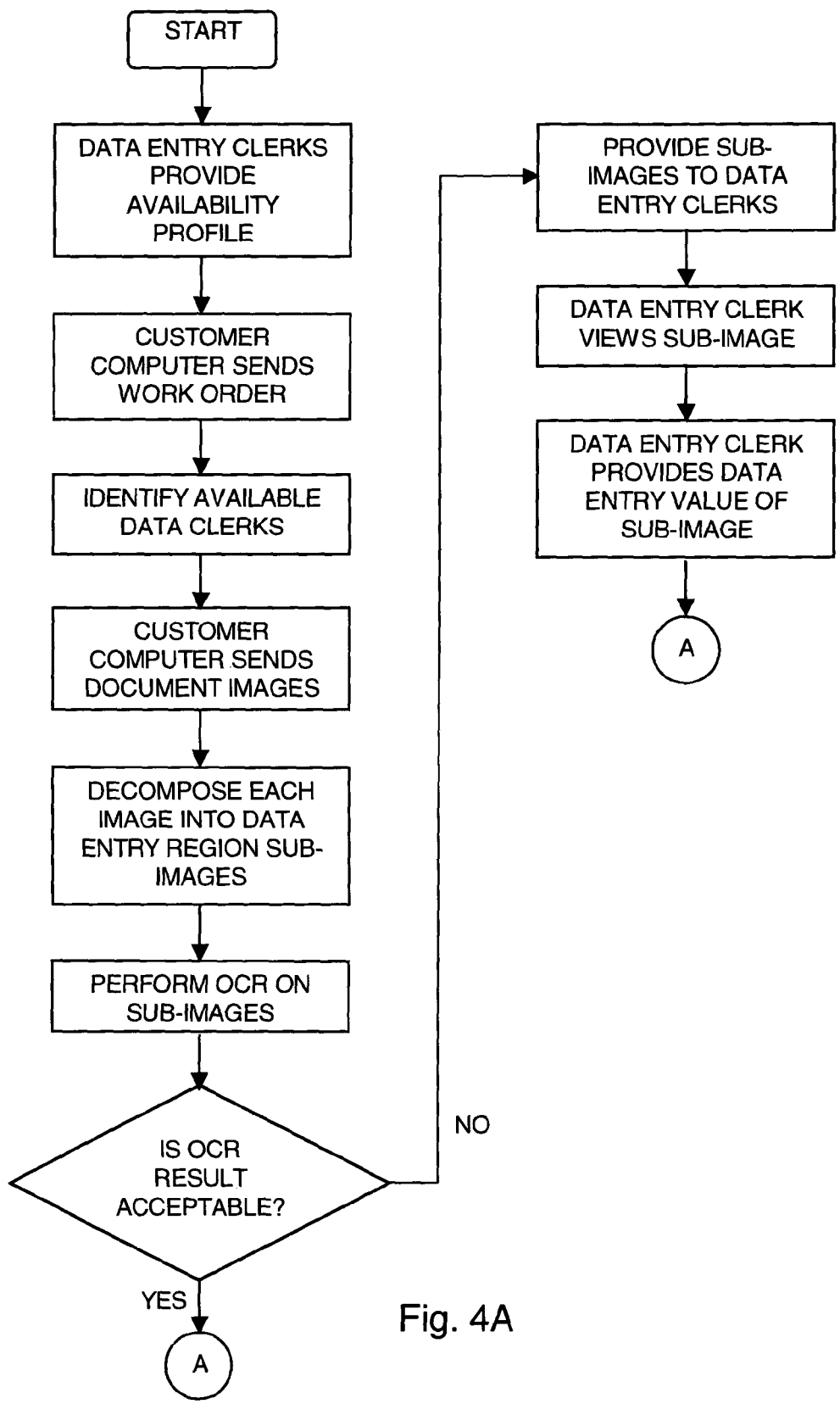
FIGS. 4A-4B, taken together, is a simplified flowchart illustration of an exemplary mode of operation of the architecture of FIG. 1, operative in accordance with a preferred embodiment of the present invention.
Figure 4B:
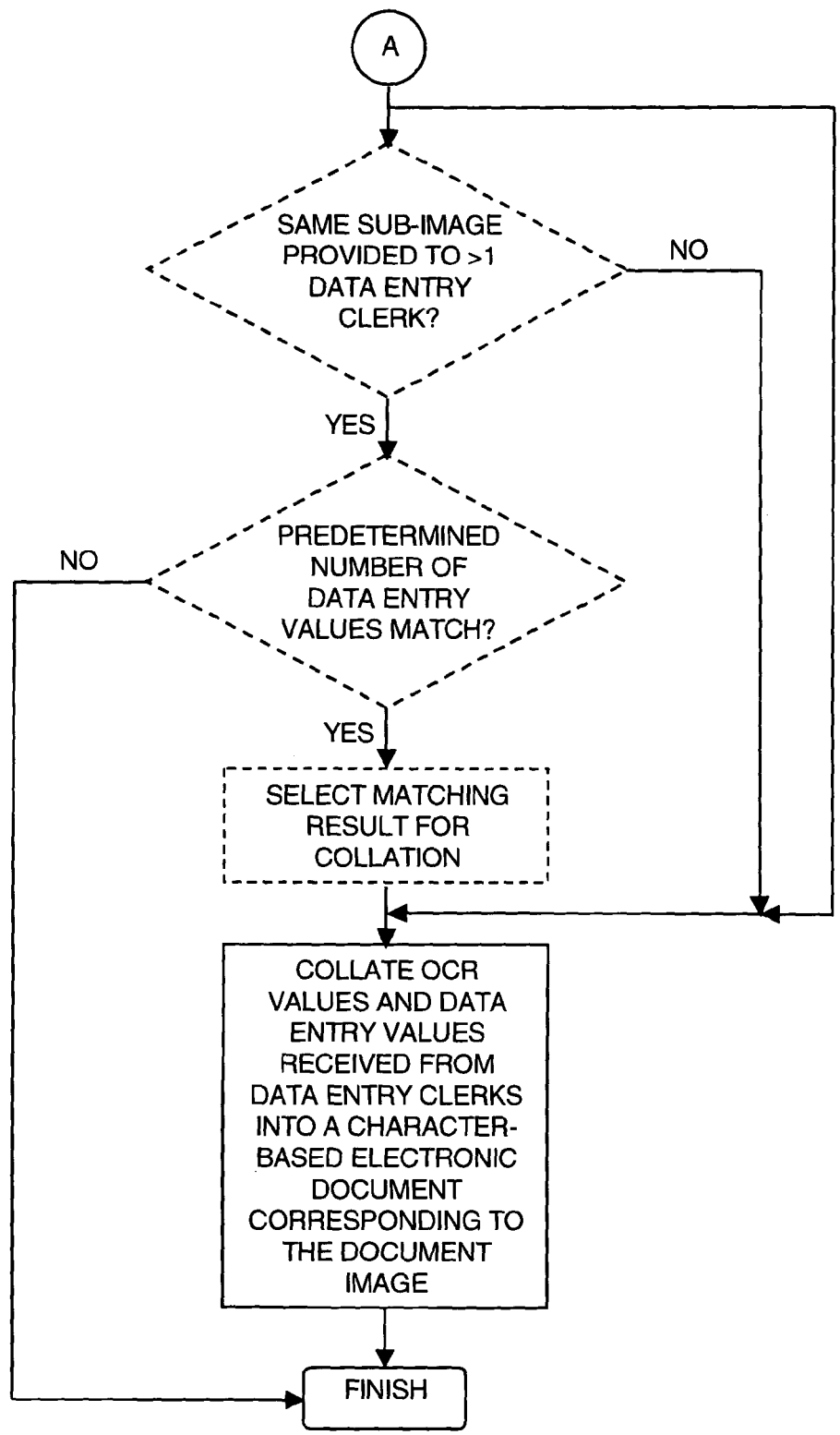

Reference is now made to FIGS. 4A and 4B, which, taken together, is a simplified flowchart illustration of an exemplary mode of operation of the architecture of FIG. 1, operative in accordance with a preferred embodiment of the present invention. The method of FIGS. 4A and 4B is similar to the method of FIGS. 2A and 2B except as is now noted. As in the method of FIGS. 2A and 2B computer 102 or 106 decomposes each image into one or more data entry region sub-images using conventional techniques, where each sub-image includes a recognition element. However, each sub-image is then subject to conventional OCR processing. Where the result of OCR processing for a sub-image indicates that the sub-image was not successfully processed, or if a confidence rating related to a result of said performing optical character recognition is below a predefined threshold, computer 102 provides the sub-image to one or more available data entry clerks at one or more computers 100. The data entry clerk then views the sub-image, keys in a data entry value from the characters appearing in the recognition element of the sub-image, and transmits the data entry value to computer 102. For each document image, computer 102, collates successful OCR results and data entry values received from data entry clerks into a character-based electronic document corresponding to the document image.

Figure 5A:
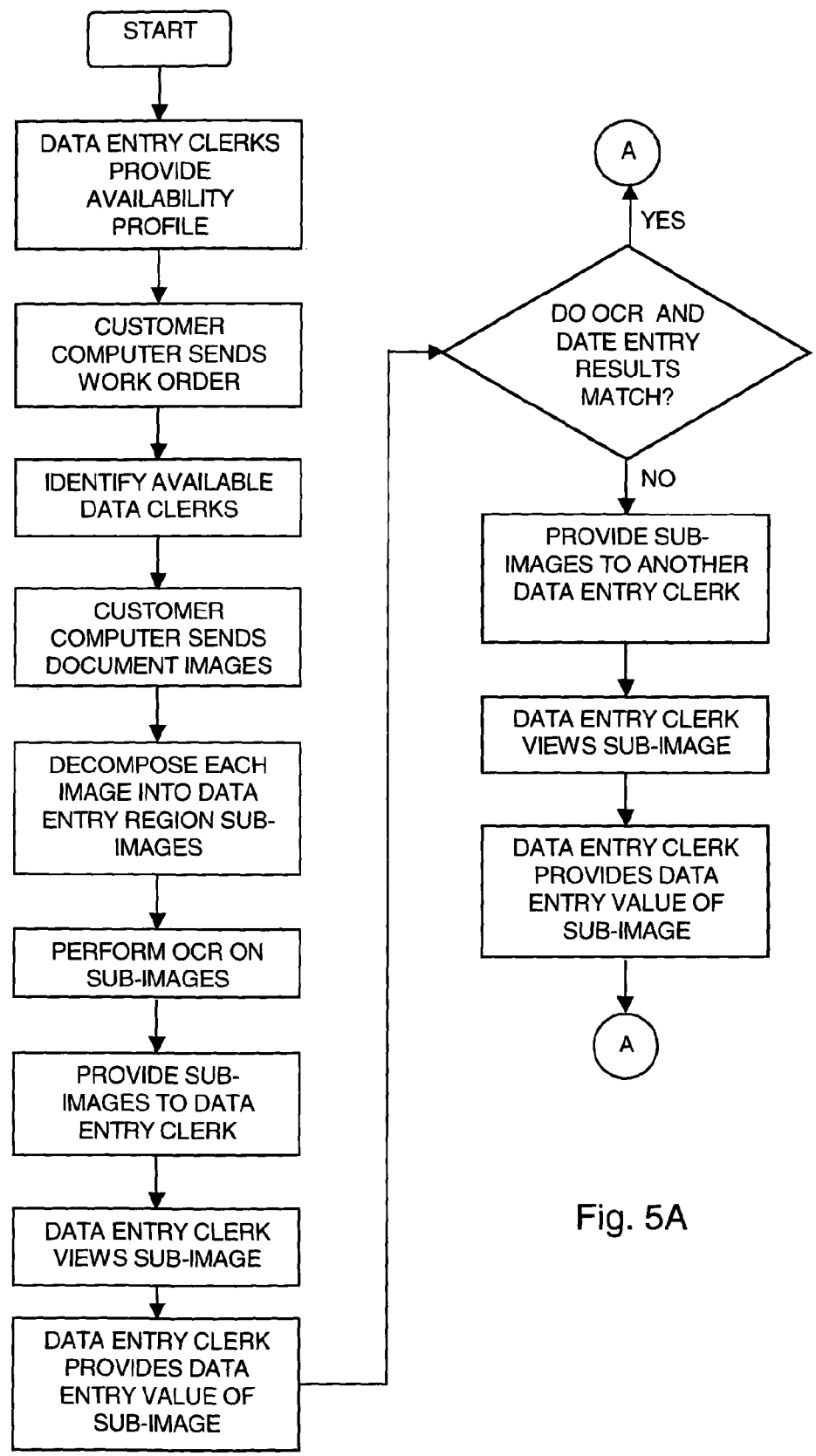
FIGS. 5A-5B, taken together, is a simplified flowchart illustration of an exemplary mode of operation of the architecture of FIG. 1, operative in accordance with a preferred embodiment of the present invention.
Figure 5B:
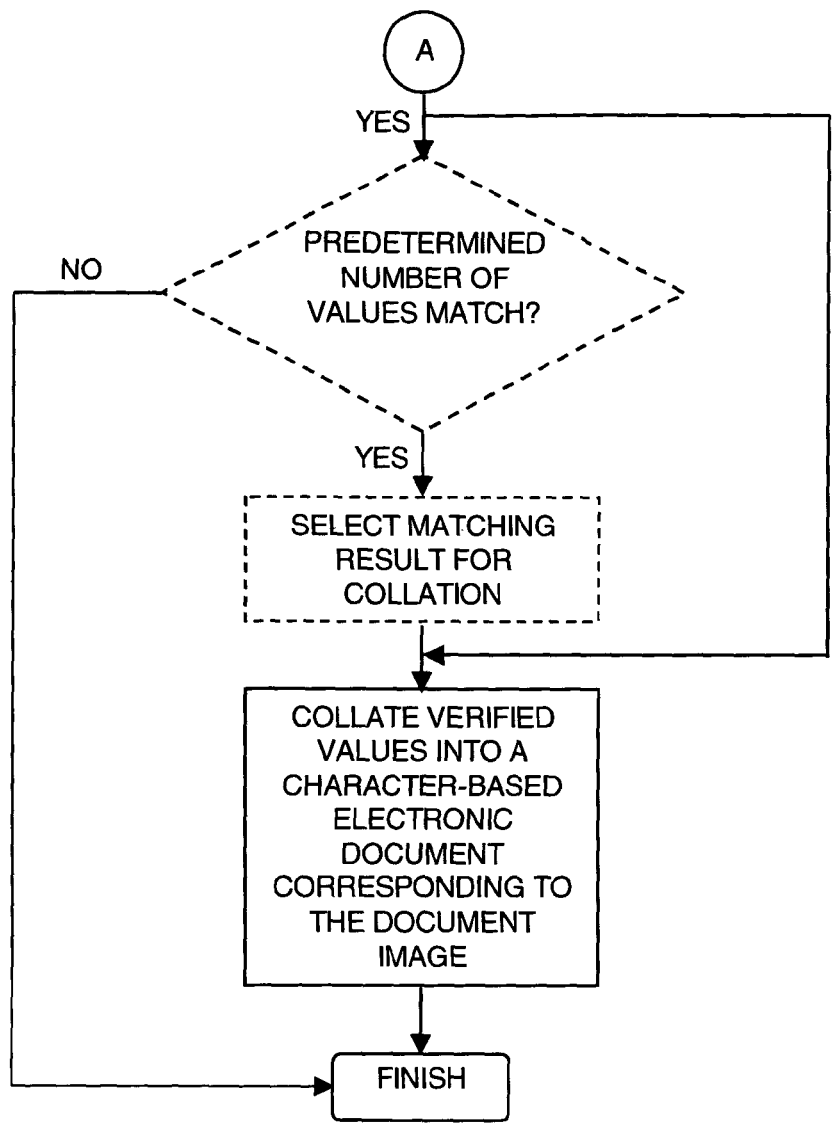

Reference is now made to FIGS. 5A and 5B, which, taken together, is a simplified flowchart illustration of an exemplary mode of operation of the architecture of FIG. 1, operative in accordance with a preferred embodiment of the present invention. The method of FIGS. 5A and 5B is similar to the method of FIGS. 2A and 2B except as is now noted. As in the method of FIGS. 2A and 2B computer 102 or 106 decomposes each image into one or more data entry region sub-images using conventional techniques, where each sub-image includes a recognition element. However, each sub-image is then subject to conventional OCR processing. Computer 102 then provides each sub-image to one or more available data entry clerks at one or more computers 100. The data entry clerk then views the sub-image, keys in a data entry value from the characters appearing in the recognition element of the sub-image, and transmits the data entry value to computer 102. Computer 102 then compares the OCR value for each sub-image with the data entry value for the same sub-image. Computer 102 then collates those data entry values and OCR values that have been "validated," i.e., where the values are the same, into a character-based electronic document corresponding to the document image. Where the data entry value and the OCR value for a sub-image differ, computer 102 provides the sub-image to at least one other available data entry clerk at computer 100 to whom the sub-image was not previously provided. As before, the data entry clerk then views the sub-image, keys in a data entry value from the characters appearing in the recognition element of the sub-image, and transmits the data entry value to computer 102. Computer 102 then compares the OCR value for the sub-image with each of the data entry values for the same sub-image. If a predetermined number of the values are the same, the matching result is considered to be the verified result, which computer 102 then collates as indicated above. Alternatively, computer 102 then compares each of the data entry values for the same sub-image, and considers a value to be verified only if a predetermined number of data entry values are the same.

Figure 6:
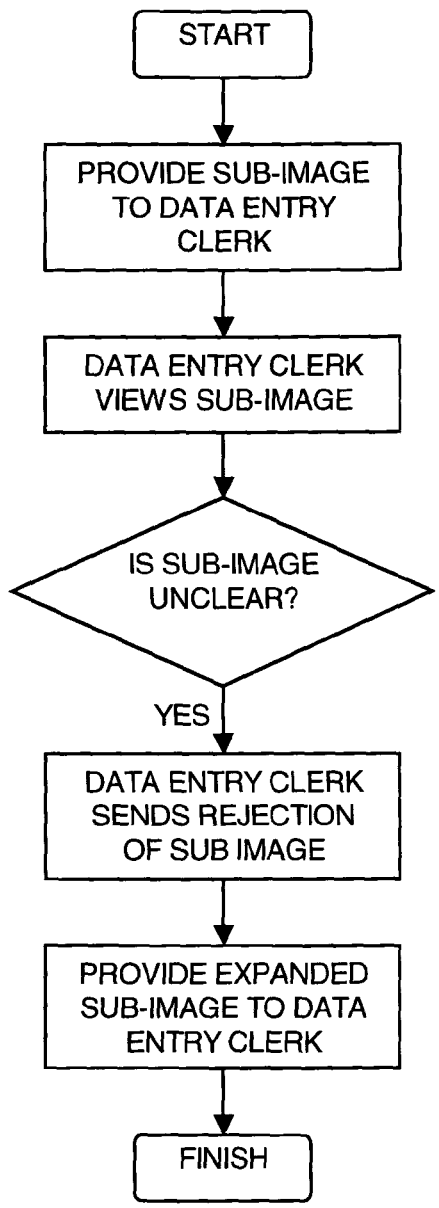
FIG. 6 is a simplified flowchart illustration of an exemplary mode of operation of the architecture of FIG. 1, operative in accordance with a preferred embodiment of the present invention.

Reference is now made to FIG. 6, which is a simplified flowchart illustration of an exemplary mode of operation of the architecture of FIG. 1, operative in accordance with a preferred embodiment of the present invention. The method of FIG. 6 may be used in conjunction with any of the methods described herein. In the method of FIG. 6, computer 102 provides a sub-image to one or more available data entry clerks at one or more computers 100. The data entry clerk then views the sub-image, and, if the sub-image is unclear, the data entry clerk may send to computer 102 an indicator associated with the subimage rejecting the sub-image, whereupon computer 102 may send to the data entry clerk an expanded data entry region sub-image that includes said rejected data entry region subimage. The expanded sub-image may include more area of the document image and/or may be magnified using conventional techniques.

Figure 7:
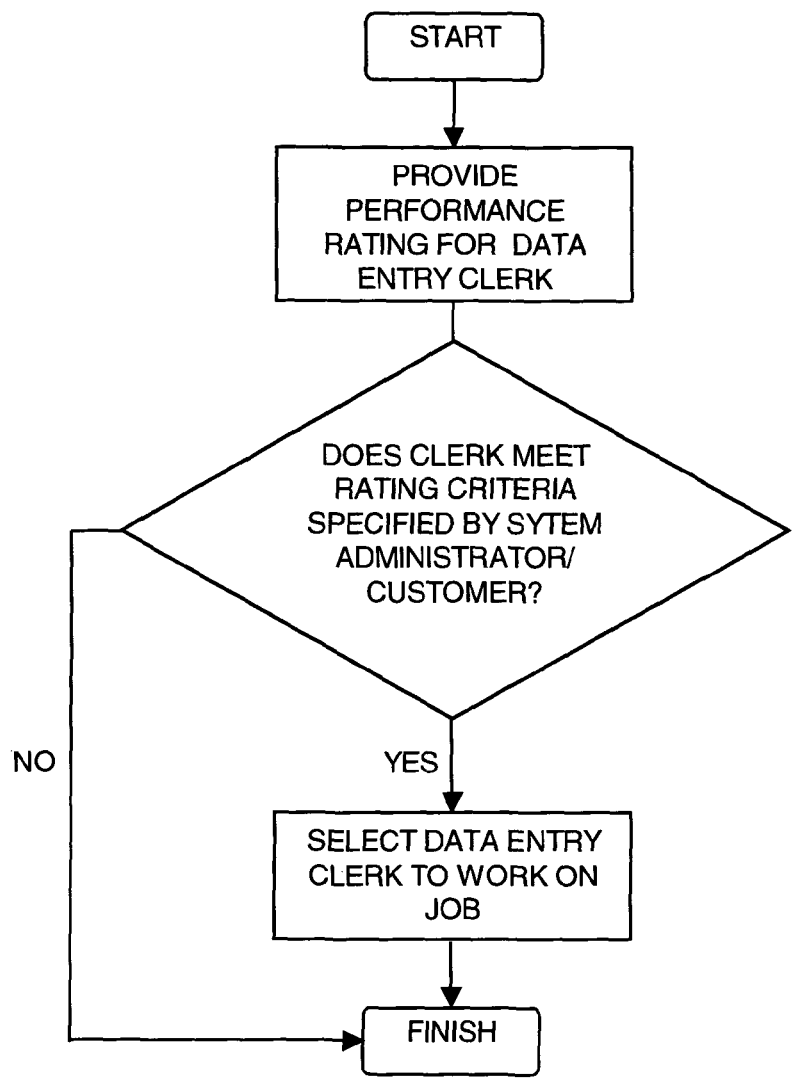
FIG. 7 is a simplified flowchart illustration of an exemplary mode of operation of the architecture of FIG. 1, operative in accordance with a preferred embodiment of the present invention.
Figure 8:
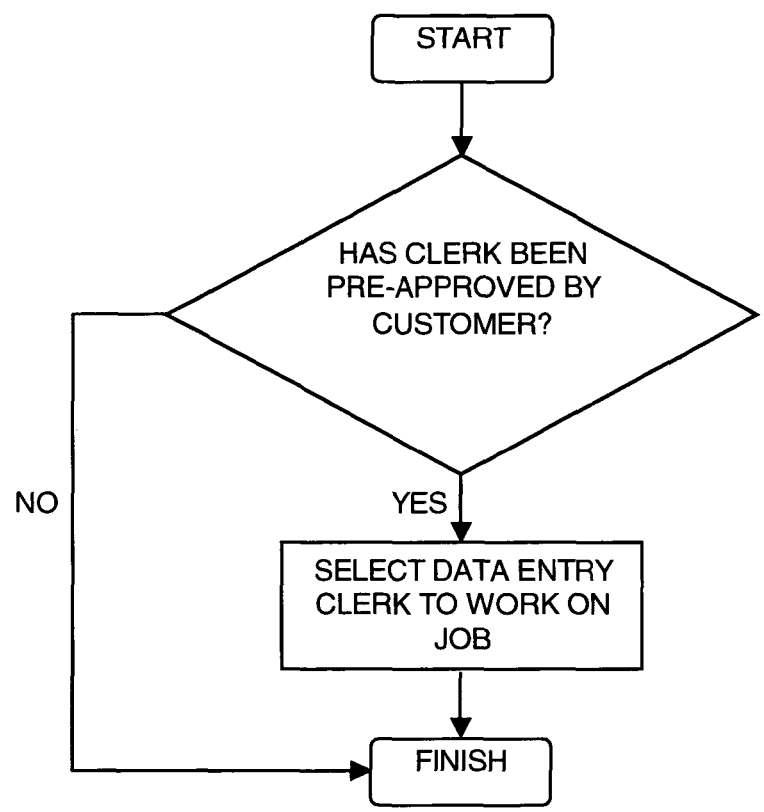
FIG. 8 is a simplified flowchart illustration of an exemplary mode of operation of the architecture of FIG. 1, operative in accordance with a preferred embodiment of the present invention.

Reference is now made to FIG. 7, which is a simplified flowchart illustration of an exemplary mode of operation of the architecture of FIG. 1, operative in accordance with a preferred embodiment of the present invention. The method of FIG. 7 may be used in conjunction with any of the methods described herein. In the method of FIG. 7 a data entry clerk is given a performance rating using any known rating technique. The rating may be based on past performance and/or based on performance given a predefined set of training images whose values are known. When selecting a data entry clerk for work on a particular job, only those data entry clerks whose performance rating equals or exceeds a performance rating specified by the system administrator or by the customer in a work order may be selected to work on the job. Similarly, as is shown with particular reference to FIG. 8, when selecting a data entry clerk for work on a particular job, only those data entry clerks who have been pre-approved by the system administrator or by the customer, such as by specifically identifying the clerk or by pre-approving clerks according to specific attributes such as, but not limited to, qualification level, geographic location, or organizational association, may be selected to work on the job.

It is appreciated that one or more of the steps of any of the methods described herein may be omitted or carried out in a different order than that shown, without departing from the true spirit and scope of the invention.

While the present invention has been described with reference to one or more specific embodiments, the description is intended to be illustrative of the invention as a whole and is not to be construed as limiting the invention to the embodiments shown. It is appreciated that various modifications may occur to those skilled in the art that, while not specifically shown herein, are nevertheless within the true spirit and scope of the invention.

What is claimed is:

1. A system for using an interactive media application, comprising:
    a scanned image of a document to be processed, the scanned image obtained by a processor performing a scan for readable information on the document;
    a computer that decomposes the image of the document into at least one sub-image, the sub-image defining a readable information-based element;
    a computer that transmits the at least one sub-image to a plurality of data entry computers when a confidence rating related to an outcome from performing scan for readable information on the sub-image is below a predefined threshold, the sub-image being displayed on one or more data entry computers so as to allow one or more user-based inputs, in response to observation of the displayed sub-image, to provide one or more user-based data entry values respectively from at least one of the data entry computers, the one or more user-based data entry values being communicated over the network to a receiving computer; and
    wherein the receiving computer determines if the one or more user-based data entry values provide a predetermined level of confidence and computes a verified result.

2. The system of claim 1 wherein the readable-information based element comprises a character-based recognition element.

3. The system of claim 2 further comprising a computer that performs optical character recognition (OCR) on at least the sub-image.

4. The system of claim 3 wherein the verified result identifies the character-based recognition element when the confidence rating related to the outcome from performing OCR on the sub-image indicates the sub-image was not successfully processed.

5. The system of claim 3 wherein the verified result confirms the character-based recognition element when the confidence rating related to the outcome from performing OCR on the sub-image is below the predefined threshold.

6. The system of claim 1 wherein one or more user-based data entry values is communicated over a network to the receiving computer.

7. The system of claim 1 wherein the at least one sub-image is transmitted to the one or more data entry computers over the Internet.

8. The system of claim 1 wherein the computer that decomposes includes the receiving computer that performs the computing.

9. The system of claim 1 wherein the verified result is collated into a character-based electronic document corresponding to the document image.

10. The system of claim 3, further comprising a computer that determines whether a value generated by the OCR matches the verified result.

11. The system of claim 1 wherein the at least one sub-image comprises at least one sub-image that is provided to at least one of the one or more data entry computers, wherein a user at the at least one of the one or more data entry computers is known to be available for viewing the sub-image.

12. The system of claim 1 wherein the at least one sub-image comprises a sub-image provided to a user at one or more of the one or more data entry computers in connection with a work order.

13. The system of claim 10, further comprising a computer that determines that the user at the one or more data entry computers is available if a profile associated with the user matches a profile associated with the work order.

14. The system of claim 1 further comprising a computer that determines whether predetermined number of the user-based data values of a plurality of the user-based data values match so as to provide the predetermined level of confidence.

15. The system of claim 10 wherein the computer that determines whether a value generated by the OCR matches the verified result value determines whether a single one of the user-based data values matches the verified result, returns the verified result.

16. A method for using an interactive media application, comprising the steps of:

scanning a document by a processor for readable information on the document;

decomposing the image of the document into at least one sub-image, the sub-image defining a readable information-based element;

transmitting the at least one sub-image to a plurality of data entry computers when a confidence rating related to an outcome from performing scan for readable information on the sub-image is below a predefined threshold, the sub-image being displayed on one or more data entry computers so as to allow one or more user-based inputs, in response to observation of the displayed sub-image, to provide one or more user-based data entry values respectively from at least one of the data entry computers, the one or more user-based data entry values being communicated over the network to a receiving computer; and determining, with the receiving computer, if the one or more user-based data entry values provide a predetermined level of confidence, and computing, with the receiving computer, a verified result.

* * * * *